United States Patent
Takano

(10) Patent No.: US 11,236,185 B2
(45) Date of Patent: Feb. 1, 2022

(54) COPOLYMER, PRODUCTION METHOD FOR COPOLYMER, RUBBER COMPOSITION, AND TIRE

(71) Applicant: BRIDGESTONE CORPORATION, Tokyo (JP)

(72) Inventor: Shigenaga Takano, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 16/761,878

(22) PCT Filed: Sep. 27, 2018

(86) PCT No.: PCT/JP2018/036088
§ 371 (c)(1),
(2) Date: May 6, 2020

(87) PCT Pub. No.: WO2019/097853
PCT Pub. Date: May 23, 2019

(65) Prior Publication Data
US 2020/0299429 A1    Sep. 24, 2020

(30) Foreign Application Priority Data

Nov. 16, 2017 (JP) .............................. JP2017-221201

(51) Int. Cl.
*C08F 4/52* (2006.01)
*C08F 210/02* (2006.01)
(Continued)

(52) U.S. Cl.
CPC .............. *C08F 210/02* (2013.01); *B60C 1/00* (2013.01); *C08F 4/52* (2013.01); *C08F 212/08* (2013.01);
(Continued)

(58) Field of Classification Search
None
See application file for complete search history.

(56) References Cited

U.S. PATENT DOCUMENTS

2013/0197157 A1    8/2013 Kaita et al.
2013/0197179 A1    8/2013 Horikawa et al.
(Continued)

FOREIGN PATENT DOCUMENTS

| EP | 0891993 B1 | 5/2003 |
| JP | 2005-220313 A | 8/2005 |
| JP | 2015-221852 A | 12/2015 |

(Continued)

OTHER PUBLICATIONS

International Search Report for PCT/JP2018/036088 dated Dec. 25, 2018 (PCT/ISA/210).
International Preliminary Report on Patentability dated May 19, 2020 in International Application No. PCT/JP2018/036088.
(Continued)

*Primary Examiner* — Richard A Huhn
(74) *Attorney, Agent, or Firm* — Sughrue Mion, PLLC

(57) ABSTRACT

An object of the present disclosure is to provide a copolymer containing at least an acyclic non-conjugated olefin unit and a conjugated diene unit and capable of improving an elastic modulus of a rubber composition. Specifically, the present disclosure provides a copolymer containing at least an acyclic non-conjugated olefin unit and a conjugated diene unit, wherein the difference ($T_{em}-T_{im}$) between an extrapolated melting end temperature ($T_{em}$) as measured in accordance with JIS K7121 and an extrapolated melting initiation temperature ($T_{im}$) as measured in accordance with JIS K7121 is not higher than 60° C.

10 Claims, 3 Drawing Sheets

(51) Int. Cl.
*C08F 236/06* (2006.01)
*C08F 236/10* (2006.01)
*C08F 212/08* (2006.01)
*B60C 1/00* (2006.01)
*C08F 236/08* (2006.01)

(52) U.S. Cl.
CPC .......... *C08F 236/06* (2013.01); *C08F 236/08* (2013.01); *C08F 236/10* (2013.01); *C08F 2800/10* (2013.01)

(56) References Cited

U.S. PATENT DOCUMENTS

| | | | |
|---|---|---|---|
| 2014/0179861 A1* | 6/2014 | Horikawa | C08L 53/00 524/574 |
| 2016/0319057 A1 | 11/2016 | Walzer, Jr. et al. | |
| 2018/0298130 A1 | 10/2018 | Kimura et al. | |
| 2018/0298135 A1 | 10/2018 | Kimura et al. | |

FOREIGN PATENT DOCUMENTS

| WO | 2012/014455 A1 | 2/2012 |
|---|---|---|
| WO | 2012/014456 A1 | 2/2012 |
| WO | 2012/164914 A1 | 12/2012 |
| WO | 2017/065300 A1 | 4/2017 |
| WO | 2017/065301 A1 | 4/2017 |

OTHER PUBLICATIONS

Search Report dated Sep. 30, 2021, from the European patent Office in application No. 18879431.7.

* cited by examiner

COPOLYMER, PRODUCTION METHOD FOR COPOLYMER, RUBBER COMPOSITION, AND TIRE

CROSS REFERENCE TO RELATED APPLICATIONS

This application is a National Stage of International Application No. PCT/JP2018/036088 filed Sep. 27, 2018, claiming priority based on Japanese Patent Application No. 2017-221201 filed Nov. 16, 2017.

TECHNICAL FIELD

The present invention relates to a copolymer, a production method for a copolymer, a rubber composition, and a tire.

BACKGROUND ART

In general, a rubber article (such as a tire, a conveyor belt, a rubber damper, quake-absorbing rubber or the like) is required to be excellent in durability (fracture resistance, wear resistance, resistance to crack growth, and the like) and weatherproofness. A variety of rubber components and rubber compositions have been developed to satisfy such a demand of a rubber article as described above.

For example, PTL 1 discloses a copolymer of a conjugated diene compound and a non-conjugated olefin compound, wherein a conjugated diene unit thereof has a cis-1,4 bond content of greater than 70.5 mol % and the non-conjugated olefin is contained in an amount of 10 mol % or more. PTL 1 also discloses that the copolymer is used for manufacturing a rubber composition being excellent in weatherproofness and resistance to crack growth.

CITATION LIST

Patent Literature

PTL 1: WO2012/014455

SUMMARY OF THE INVENTION

Technical Problems

The copolymer disclosed in PTL 1 is useful for production of a rubber composition being excellent in weatherproofness and resistance to crack growth. However, it is necessary to improve an elastic modulus of the rubber composition, as well, in order to further improve durability of the rubber composition. A structure of a copolymer for use in a rubber composition must be optimized, in this regard, in order to improve an elastic modulus of the rubber composition. PTL 1 fails to clearly describe what is the best structure of the copolymer in terms of improving elastic modulus of the rubber composition.

In view of this, an object of the present disclosure is to provide a copolymer containing at least an acyclic non-conjugated olefin unit and a conjugated diene unit and capable of improving an elastic modulus of a rubber composition.

Further, another object of the present disclosure is to provide: a production method for a copolymer, by which a copolymer capable of improving an elastic modulus of a rubber composition can be obtained; a rubber composition having a high elastic modulus; and a tire having excellent durability.

The present disclosure has been contrived in order to solve the aforementioned problems and the primary features thereof are as follows.

A copolymer of the present disclosure is a copolymer containing at least an acyclic non-conjugated olefin unit and a conjugated diene unit, wherein the difference ($T_{em}-T_{im}$) between an extrapolated melting end temperature ($T_{em}$) as measured in accordance with JIS K7121 and an extrapolated melting initiation temperature ($T_{im}$) as measured in accordance with JIS K7121 is not higher than 60° C.

The copolymer of the present disclosure, when it is added to a rubber composition, can improve an elastic modulus, as well as weatherproofness and resistance to crack resistance, of the rubber composition.

In the present disclosure, an extrapolated melting end temperature ($T_{em}$) and an extrapolated melting initiation temperature ($T_{im}$) are temperature values as measured in accordance with JIS K7121 by differential scanning calorimetry (DSC) at a temperature increasing rate of 10° C./minute.

It is preferable that the copolymer of the present disclosure further contains an aromatic vinyl unit. Chain lengths of the acyclic non-conjugated olefin units can be easily controlled/adjusted in this case.

In a preferable example of the copolymer of the present disclosure, the acyclic non-conjugated olefin unit is constituted of only an ethylene unit. An acyclic non-conjugated olefin compound, from which the acyclic non-conjugated olefin unit is derived, is easily available and thus production cost of the copolymer can be reduced in this case.

In another preferable example of the copolymer of the present disclosure, the conjugated diene unit includes 1,3-butadiene unit and/or an isoprene unit. A conjugated diene compound, from which the conjugated diene unit is derived, is easily available and thus production cost of the copolymer can be reduced in this case.

In yet another preferable example of the copolymer of the present disclosure, the conjugated diene unit includes only 1,3-butadiene unit. A conjugated diene compound, from which the conjugated diene unit is derived, is more easily available and thus production cost of the copolymer can be further reduced than otherwise in this case.

It is preferable that the copolymer of the present disclosure further contains an aromatic vinyl unit and that the aromatic vinyl unit includes a styrene unit. An aromatic vinyl compound, from which the aromatic vinyl unit is derived, is easily available and thus production cost of the copolymer can be reduced in this case.

It is preferable that the copolymer of the present disclosure contains at least either i) an acyclic non-conjugated olefin unit and a conjugated diene unit or ii) an acyclic non-conjugated olefin unit, a conjugated diene unit, and an aromatic vinyl unit, wherein a content of the conjugated diene unit is in the range of 1 to 99 mol % and the total content of the acyclic non-conjugated olefin unit and the aromatic vinyl unit is in the range of 1 to 99 mol %. In this case, vulcanization is facilitated because double bond portions which can serve as crosslinking points exist in the copolymer, and weatherproofness of the rubber composition to which the copolymer has been added further improves because the copolymer contains the non-conjugated olefin units.

A production method for a copolymer of the present disclosure is a production method for a copolymer containing at least an acyclic non-conjugated olefin unit and a conjugated diene unit, wherein the production method comprises a copolymerization process of copolymerizing at least an acyclic non-conjugated olefin compound and a conjugated diene compound under the presence of a catalyst composition, the catalyst composition including:

a rare earth element-containing component (A) containing a rare earth element compound or a reactant resulted from a reaction between the rare earth element compound and a Lewis base;

an organic metal compound (B) represented by the following general formula (I):

$$YR^1_a R^2_b R^3_c \quad (I)$$

(In general formula (I), Y represents a metal selected from the group 1, 2, 12 and 13 elements in the periodic table, $R^1$ and $R^2$ each represent a $C_{1-10}$ hydrocarbon group or a hydrogen atom. $R^3$ represents a $C_{1-10}$ hydrocarbon group, $R^1$, $R^2$ and $R^3$ may be of either the same type as or different types, a=1 and b=c=0 when Y is a metal selected from the group 1 elements in the periodic table, a=b=1 and c=0 when Y is a metal selected from the groups 2, 12 elements in the periodic table, and a=b=c=1 when Y is a metal selected from the group 13 elements in the periodic table.);

at least one compound selected from the group consisting of an ionic compound (C) and a halogen compound (D); and a cyclic non-conjugated olefin compound (E).

According to the aforementioned production method for a copolymer of the present disclosure, it is possible to manufacture a copolymer which is capable, when added to a rubber composition, of improving not only weatherproofness and resistance to crack growth but also an elastic modulus of the rubber composition.

In a preferable example of the production method for a copolymer of the present disclosure, the copolymer further contains an aromatic vinyl unit, and the acyclic non-conjugated olefin compound, the conjugated diene compound and the aromatic vinyl compound are copolymerized under the presence of the catalyst composition in the copolymerization process. Chain lengths of the acyclic non-conjugated olefin units can be easily controlled/adjusted in this case.

The catalyst composition may further contain aluminoxane (F) in the production method for a copolymer of the present disclosure. The desired copolymer can be easily obtained in this case.

In another preferable example of the production method for a copolymer of the present disclosure, the copolymerization process includes charging the cyclic non-conjugated olefin compound (E) into a reaction vessel at the stage of charging the conjugated diene compound into the reaction vessel for the first time. Chain lengths of the acyclic non-conjugated olefin units can be made more uniform than otherwise in this case.

A rubber composition of the present disclosure is characterized in that it contains the copolymer described above. The rubber composition of the present disclosure has a high elastic modulus, as well as high resistance to crack growth and excellent weatherproofness.

A tire of the present disclosure is characterized in that it uses the rubber composition described above. The tire of the present disclosure has high durability and excellent weatherproofness.

According to the present disclosure, it is possible to provide a copolymer containing at least an acyclic non-conjugated olefin unit and a conjugated diene unit and capable of improving elastic modulus, as well as weatherproofness and resistance to crack growth, of a rubber composition.

Further, according to the present disclosure, it is possible to provide: a production method for a copolymer, by which a copolymer capable of improving resistance to crack growth, weatherproofness, and an elastic modulus of a rubber composition can be obtained: a rubber composition excellent in resistance to crack growth, weatherproofness, and an elastic modulus; and a tire having excellent durability and weatherproofness.

BRIEF DESCRIPTION OF THE DRAWINGS

In the accompanying drawings, wherein:
FIG. 1 is a DSC chart of copolymer a.

DETAILED DESCRIPTION

Figure 1:
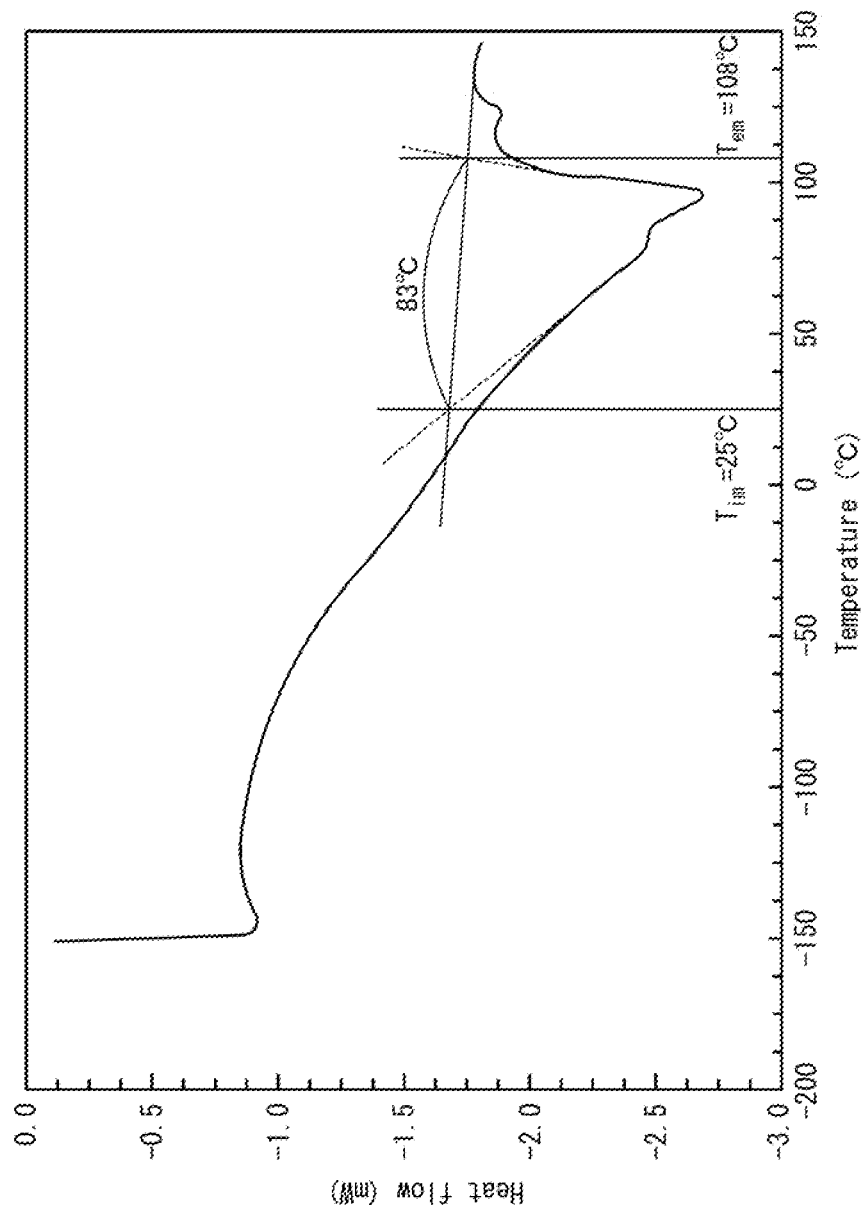

Hereinafter, a copolymer, a production method for a copolymer, a rubber composition, and a tire of the present disclosure will be demonstratively described in detail based on embodiments thereof.

<Copolymer>

A copolymer of the present disclosure is a copolymer containing at least an acyclic non-conjugated olefin unit and a conjugated diene unit, wherein the difference ($T_{em}-T_{im}$) between an extrapolated melting end temperature ($T_{em}$) as measured in accordance with JIS K7121 and an extrapolated melting initiation temperature ($T_{im}$) as measured in accordance with JIS K7121 is not higher than 60° C.

The copolymer of the present disclosure, containing an acyclic non-conjugated olefin unit, can reduce a proportion of double bonds in the main chain thereof and thus exhibits high resistance to crack growth excellent weatherproofness.

In a copolymer containing at least an acyclic non-conjugated olefin unit and a conjugated diene unit, a melting peak derived from the acyclic non-conjugated olefin unit is observed by differential scanning calorimetiy (DSC) measurement. The copolymer of the present disclosure has, in this regard, the difference ($T_{em}-T_{im}$) between an extrapolated melting end temperature ($T_{em}$) and an extrapolated melting initiation temperature ($T_{im}$) as measured in accordance with JIS K7121, which difference is not higher than 60° C. Accordingly, the copolymer of the present disclosure exhibits a sharp melting peak and has uniform chain lengths of the acyclic non-conjugated olefin units. It should be noted that, when chain lengths of the acyclic non-conjugated olefin units are not uniform, a degree of crystallinity varies among the acyclic non-conjugated olefin units, which increases a width of a melting peak derived from the acyclic non-conjugated olefin units as described above and thus results in a broad melting peak. The inventors of the present disclosure, as a result of a keen study, discovered that an elastic modulus of a rubber composition significantly improves when the aforementioned copolymer having the difference ($T_{em}-T_{im}$) of ≤60° C. is blended in the rubber composition. The reason for the improvement of an elastic modulus of the rubber composition described above is not clear but it is assumed that the uniform chain lengths of the acyclic non-conjugated olefin units suppress variation in a degree of crystallinity of the acyclic non-conjugated olefin units, thereby possibly contributing to improving an elastic modulus of the rubber composition.

It is therefore possible to improve an elastic modulus, as well as weatherproofness and resistance to crack growth, of a rubber composition by blending the copolymer of the present disclosure in the rubber composition.

Although preferable temperature ranges of $T_{em}$ and $T_{im}$ are not particularly restricted as long as $(T_{em}-T_{im})$ is not higher than 60° C., $T_{im}$ is preferably in the range of 40° C. to 80° C. and $T_{em}$ is preferably in the range of 90° C. to 130° C.

The copolymer of the present disclosure, containing at least an acyclic non-conjugated olefin unit and a conjugated diene unit, may either be constituted of only an acyclic non-conjugated olefin unit and a conjugated diene unit or further contain another monomer unit.

The acyclic non-conjugated olefin unit is derived from an acyclic non-conjugated olefin compound. The acyclic non-conjugated olefin compound represents an acyclic aliphatic unsaturated hydrocarbon compound having at least one carbon-carbon double bond. Type of the acyclic non-conjugated olefin compound is not particularly restricted but the acyclic non-conjugated olefin compound preferably has two to ten carbon atoms. Examples of such an acyclic non-conjugated olefin compound as described above include: α-olefin such as ethylene, propylene, 1-butene, 1-pentene, 1-hexene, 1-heptene, 1-octene, and the like, a heteroatom-substituted alkene compound such as vinyl pivalate, 1-phenylthio ethene, N-vinylpyrrolidone; and the like. The acyclic non-conjugated olefin compound is preferably α-olefin and particularly preferably ethylene among the examples. An acyclic non-conjugated olefin compound like α-olefin, ethylene in particular, has a double bond at α-position of the olefin, whereby the compound can be effectively polymerized with a diene compound described below and can also further improve, when it is used for a copolymer, weatherproofness of a rubber composition and a tire using the copolymer.

In the copolymer of the present disclosure, it is particularly preferable that the acyclic non-conjugated olefin unit is constituted of only an ethylene unit. In a case where the acyclic non-conjugated olefin unit is constituted of only an ethylene unit, an acyclic non-conjugated olefin compound from which the acyclic non-conjugated olefin unit is derived, i.e. ethylene, is easily available and thus production cost of the copolymer can be reduced.

In the copolymer of the present disclosure, a content of the acyclic non-conjugated olefin unit is preferably in the range of 1 mol % to 99 mol %. When the content of the acyclic non-conjugated olefin unit is ≥1 mol %, weatherproofness of the copolymer further improves. When the content of the acyclic non-conjugated olefin unit is ≤99 mol %, a content of the conjugated diene unit is large enough to facilitate vulcanization of the copolymer.

The conjugated diene unit is derived from a conjugated diene compound. Although type of the conjugated diene compound is not particularly restricted, the conjugated diene compound preferably has four to eight carbon atoms. Specific examples of the conjugated diene compound include 1,3-butadiene, isoprene, 1,3-pentadiene, 2,3-dimethyl-1,3-butadiene, and the like. 1,3-butadiene and isoprene are preferable and 1,3-butradiene is particularly preferable among these examples. In the copolymer of the present disclosure, the conjugated diene unit preferably includes 1,3-butadiene unit and/or isoprene unit. When the conjugated diene unit includes 1,3-butadiene unit and/or isoprene unit, a conjugated diene compound from which the conjugated diene unit is derived (i.e. 1,3-butadiene, isoprene) is easily available and thus production cost of the copolymer can be reduced.

Further, in the copolymer of the present disclosure, it is particularly preferable that the conjugated diene unit is constituted exclusively of 1,3-butadiene. When the conjugated diene unit is constituted exclusively of 1,3-butadiene, a conjugated diene compound from which the conjugated diene unit is derived (i.e. 1,3-butadiene) is easily available and thus production cost of the copolymer can be reduced.

Yet further, in the copolymer of the present disclosure, a content of the conjugated diene unit is preferably in the range of 1 mol % to 99 mol %. When the content of the conjugated diene unit is ≥1 mol %, the copolymer can be easily vulcanized. When the content of the conjugated diene unit is ≤99 mol %, weatherproofness of the copolymer further improves. The content of the conjugated diene unit is more preferably ≤85 mol %, further more preferably ≤80 mol %, and particularly preferably ≤70 mol %. The smaller content of the conjugated diene unit results in the better weatherproofness of the copolymer.

It is preferable that the copolymer of the present disclosure further contains an aromatic vinyl unit, in addition to the acyclic non-conjugated olefin unit and the conjugated diene unit. When the copolymer contains an aromatic vinyl unit, chain lengths of the acyclic non-conjugated olefin units can be more easily controlled/adjusted than otherwise.

The aromatic vinyl unit is derived from an aromatic vinyl compound. An "aromatic vinyl compound" represents an aromatic compound which has been substituted by at least vinyl group. Although type of the aromatic vinyl compound is not particularly restricted, the aromatic vinyl compound preferably has eight to ten carbon atoms. Specific examples of the aromatic vinyl compound include styrene, α-methylstyrene, o-methylstyrene, m-methylstyrene, p-methylstyrene, o, p-dimethyl styrene, o-ethylstyrene, m-ethylstyrene, p-ethylstyrene, and the like. Any of the aforementioned aromatic vinyl compounds can be used, without particular restrictions, as the aromatic vinyl compound. Styrene is particularly preferable among the examples.

The copolymer of the present disclosure preferably includes a styrene unit as the aromatic vinyl unit. When the copolymer includes a styrene unit, an aromatic vinyl compound from which the aromatic vinyl unit is derived (i.e. styrene) is easily available and thus production cost of the copolymer can be reduced.

A content of the aromatic vinyl unit is preferably in the range of 0 mol % to 30 mol % in the copolymer of the present disclosure.

In the copolymer of the present disclosure, it is particularly preferable that a content of the conjugated diene unit is in the range of 1 to 99 mol % and the total content of the acyclic non-conjugated olefin unit and the aromatic vinyl unit is in the range of 1 to 99 mol %. When the content of the conjugated diene unit is ≥1 mol %, the copolymer can be easily vulcanized. When the total content of the acyclic non-conjugated olefin unit and the aromatic vinyl unit is ≥1 mol %, weatherproofness of the copolymer further improves and thus the copolymer, blended in the rubber composition, further improves weatherproofness of the rubber composition.

In this regard, the total content of the acyclic non-conjugated olefin unit and the aromatic vinyl unit is more preferably ≥15 mol %, further more preferably ≥20 mol %, and particularly preferably ≥30 mol %. The larger total content of the acyclic non-conjugated olefin unit and the aromatic vinyl unit results in the better weatherproofness of the copolymer.

In a case where the copolymer of the present disclosure contains an aromatic vinyl content, it is preferable that a content of the conjugated diene unit is in the range of 1 to 50 mol %, a content of the acyclic non-conjugated olefin unit is in the range of 40 to 97 mol %, and a content of the aromatic vinyl unit is in the range of 2 to 35 mol %.

In the copolymer of the present disclosure, it is preferable that a main chain thereof is constituted exclusively of an acyclic structure, so that resistance to crack growth of the copolymer further improves. NMR is employed as a primary measurement means for determining whether a main chain of the copolymer has a cyclic structure or not. Specifically, when a peak derived from a cyclic structure existing in a main chain (e.g. a peak appearing in a range of 10 ppm to 24 ppm in cases of three-membered ring, four-membered ring, and five-membered ring) is not observed, the result indicates that the main chain of the copolymer is constituted exclusively of non-cyclic structures.

In the copolymer of the present disclosure, the melting point thereof measured by a differential scanning calorimeter (DSC) is preferably in the range of 30° C. to 130° C. and more preferably in the range of 30° C. to 110° C. When the melting point of the copolymer is equal to 30° C. or higher, a degree of crystallinity of the copolymer is high and crack resistance of the rubber composition further improves. When the melting point of the copolymer is equal to 130° C. or lower, workability of the rubber composition further improves.

In the present disclosure, a "melting point" represents a value measured by the method described in "EXAMPLES" described below.

In the copolymer of the present disclosure, a degree of crystallinity is preferably in the range of 0.5 to 50%, more preferably in the range of 3 to 45%, and further more preferably in the range of 5 to 45%. When a degree of crystallinity of the copolymer is ≥0.5%, crystallinity attributed to the non-conjugated olefin unit is well ensured and crack resistance of the rubber composition further improves. When a degree of crystallinity of the copolymer is ≤50%, workability in a mixing and kneading process of the rubber composition, as well as tackiness of the rubber composition containing the copolymer, improves, thereby improving workability in attaching rubber members made of the rubber composition to each other to form a rubber article such as a tire.

In the present disclosure, a "degree of crystallinity" represents a value measured according to a method described in "EXAMPLES" described below.

The copolymer of the present disclosure has a weight average molecular weight (Mw) in terms of polystyrene preferably in the range of 10.000 to 10,000,000, more preferably in the range of 100,000 to 9,000,000, and further more preferably in the range of 150,000 to 8,000,000. The weight average molecular weight (Mw) of the copolymer, of 10,000 or more, ensures that the rubber composition has satisfactory mechanical strength and the MW of the copolymer, of 10,000,000 or less, ensures good workability of the rubber composition.

Further, the copolymer of the present disclosure has a number average molecular weight (Mn) in terms of polystyrene preferably in the range of 10,000 to 10,000,000, more preferably in the range of 50,000 to 9,000,000, and further more preferably in the range of 100,000 to 8,000,000. The number average molecular weight (Mn) of the copolymer, of 10,000 or more, ensures that the rubber composition has satisfactory mechanical strength and the Mn of the copolymer, of 10,000,000 or less, ensures good workability of the rubber composition.

Yet further, the copolymer of the present disclosure has a molecular weight distribution [Mw/Mn (the weight average molecular weight/the number average molecular weight)] preferably in the range of 1.00 to 4.00, more preferably in the range of 1.50 to 3.50, and further more preferably in the range of 1.80 to 3.00. It is possible to make physical properties of the copolymer satisfactorily uniform by setting the molecular weight distribution of the copolymer to be ≤4.00.

A weight average molecular weight (Mw), a number average molecular weight (Mn), and a molecular distribution (Mw/Mn) are determined, relative to those of polystyrene as a standard reference material, by gel permeation chromatography (GPC).

In the copolymer of the present disclosure, endothermic energy of the endothermic peak thereof in the range of 0° C. to 120° C., measured by a differential scanning calorimeter (DSC), is preferably in the range of 10 J/g to 150 J/g and more preferably in the range of 30 J/g to 120 J/g. When the endothermic energy of the endothermic peak of the copolymer is ≥10 J/g, a degree of crystallinity of the copolymer is high enough and crack resistance of the rubber composition further improves. When the endothermic energy of the endothermic peak of the copolymer is ≤150 J/g, workability of the rubber composition further improves.

In the present disclosure, "endothermic energy of the endothermic peak" of the copolymer represents a value measured according to a method described in "EXAMPLES" below.

<Method for Manufacturing Copolymer>

The copolymer of the present disclosure described above can be obtained by, for example, copolymerizing at least an acyclic non-conjugated olefin compound and a conjugated diene compound under the presence of a catalyst composition, the catalyst composition including:

a rare earth element-containing component (A) containing a rare earth element compound or a reactant resulted from a reaction between the rare earth element compound and a Lewis base:

an organic metal compound (B) represented by the following general formula (I):

$$YR^1_a R^2_b R^3_c \tag{I}$$

(In general formula (I), Y represents a metal selected from the group 1, 2, 12 and 13 elements in the periodic table, $R^1$ and $R^2$ each represent a $C_{1-10}$ hydrocarbon group or a hydrogen atom, $R^3$ represents a $C_{1-10}$ hydrocarbon group, $R^1$, $R^2$ and $R^3$ may be of either the same type as or different types, a=1 and b=c=0 when Y is a metal selected from the group 1 elements in the periodic table, a=b=1 and c=0 when Y is a metal selected from the groups 2, 12 elements in the periodic table, and a=b=c=1 when Y is a metal selected from the group 13 elements in the periodic table.);

at least one compound selected from the group consisting of an ionic compound (C) and a halogen compound (D); and a cyclic non-conjugated olefin compound (E).

It is possible to make chain lengths of the acyclic non-conjugated olefin units uniform by using the cyclic non-conjugated olefin compound (E) in the catalyst composition, thereby enabling, for example, production of such a copolymer in which the difference ($T_{em}-T_{im}$) between an extrapolated melting end temperature ($T_{em}$) as measured in accordance with JIS K7121 and an extrapolated melting initiation temperature ($T_{im}$) as measured in accordance with JIS K7121 is not higher than 60° C. as described above. It should be noted that the cyclic non-conjugated olefin compound (E) is not incorporated into the copolymer according to the production method described above.

It is therefore possible, according to the production method for a copolymer of the present disclosure, to obtain a copolymer which is capable, when added to a rubber composition, of improving not only weatherproofness and resistance to crack growth but also an elastic modulus of the rubber composition.

Further, in a case where the copolymer should further contain an aromatic vinyl unit, it is possible to manufacture a copolymer containing an aromatic vinyl unit by copolymerizing the acyclic non-conjugated olefin compound, the conjugated diene compound and an aromatic vinyl compound under the presence of the catalyst composition described above. Control/adjustment of chain lengths of the acyclic non-conjugated olefin units is made easier by use of an aromatic vinyl compound as a monomer.

The same definitions of the acyclic non-conjugated olefin compound and the conjugated diene compound described in the <Copolymer> section above are applied to the acyclic non-conjugated olefin compound and the conjugated diene compound for use in production of the copolymer. Similarly, the same definition of the aromatic vinyl compound described in the <Copolymer> section above is applied to the aromatic vinyl compound which can be used in production of the copolymer.

The rare earth element-containing component (A) for use in the catalyst composition includes a rare earth element compound or a reactant resulted from a reaction between the rare earth element compound and a Lewis base. In the present disclosure, a "rare earth element compound" represents a compound containing: one of lanthanoid elements constituted of atomic number 57-71 elements in the periodic table; or scandium/yttrium. Specific examples of the lanthanoid elements include lanthanum, cerium, praseodymium, neodymium, promethium, samarium, europium, gadolinium, terbium, dysprosium, holmium, erbium, thulium, ytterbium, and lutetium. Either a single type or combination of two or more types of the aforementioned examples may be used as the rare earth element-containing component (A).

Preferable examples of the rare earth element-containing component (A) include:

a metallocene complex represented by following general formula (II):

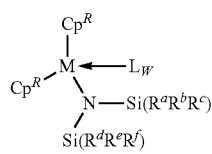

(II)

(In formula (II), M represents lanthanoid, scandium or yttrium; $Cp^R$s each independently represent a substituted indenyl; $R^a$ to $R^f$ each independently represent a $C_{1-3}$ alkyl group or hydrogen atom; L represents a neutral Lewis base; and w represents an integer in the range of 0 to 3);

a metallocene complex represented by following general formula (III):

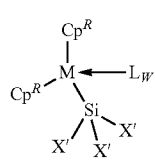

(III)

(In formula (III), M represents lanthanoid, scandium or yttrium; $Cp^R$s each independently represent a substituted indenyl; X' represents hydrogen atom, halogen atom, alkoxy, thiolate, amide, silyl, or a $C_{1-20}$ hydrocarbon group; L represents a neutral Lewis base; and w represents an integer in the range of 0 to 3); and a half metallocene cation complex represented by following general formula (IV):

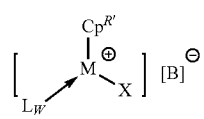

(IV)

(In formula (IV), M represents a lanthanoid element, scandium or yttrium; $Cp^{R'}$ represents a substituted cyclopentadienyl, a substituted indenyl or a substituted fluorenyl; X represents hydrogen atom, halogen atom, alkoxy, thiolate, amide, silyl, or a $C_{1-20}$ hydrocarbon group; L represents a neutral Lewis base; w represents an integer in the range of 0 to 3); and $[B]^-$ represents a non-coordinating anion).

The core metal M in each of general formulae (II), (III) and (IV) is a lanthanoid element, scandium or yttrium. The lanthanoid elements include 15 elements having atomic numbers 57-71 in the periodic table and any of these elements is acceptable. Preferable examples of the core metal M include samarium Sm, neodymium Nd, praseodymium Pr, gadolinium Gd, cerium Ce, holmium Ho, scandium Sc, and yttrium Y.

$Cp^R$s are substituted indenyls in the metallocene complexes represented by general formula (II) and general formula (III). $Cp^R$ having an indenyl ring as the base skeleton may be represented as $C_9H_{7-X}R_X$ or $C_9H_{11-X}R_X$, wherein X represents the number of the substituent group on the substituted indenyl group and is an integer in the range of 1 to 7 or 1 to 11; Rs preferably each independently represent hydrocarbyl or metalloid group; and the number of carbon atoms of the hydrocarbyl group is preferably in the range of 1 to 20, more preferably in the range of 1 to 10, and further more preferably in the range of 1 to 8. Specifically, preferable examples of the hydrocarbyl group include methyl, ethyl, tert-butyl, phenyl, benzyl groups and the like. Examples of metalloid of the metalloid group include germyl Ge, stannyl Sn, and silyl Si. The metalloid group preferably includes a hydrocarbyl group which is defined in the same manner as the aforementioned hydrocarbyl group. Specific examples of the metalloid group include trialkylsilyl group such as trimethylsilyl group, t-butyldimethylsilyl group, and the like. Specific examples of the substituted indenyl include 2-phenylindenyl, 2-methylindenyl, 1-methyl-2-phenylindenyl, 1,3-bis(t-butyldimethylsilyl)indenyl, 1-ethyl-2-phenylindenyl, 1-benzyl-2-phenylindenyl, and the like. The two $Cp^R$s in general formula (II) may be of either the same type or different types. The two $Cp^R$s in general formula (III) may be of either the same type or different types.

The metallocene complex represented by general formula (II) includes a silylamide ligand $[—N(SiR^aR^bR^c)(SiR^dR^eR^f)]$. R groups included in the silylamide ligand (i.e. $R^a$ to $R^f$ in general formula (II)) each independently represent a $C_{1-3}$ alkyl group or a hydrogen atom. It is preferable that at least one of $R^a$ to $R^f$ is a hydrogen atom. The catalyst can be easily synthesized and an acyclic non-conjugated olefin compound can be easily introduced due to relatively little hindrance around the silicon atom when at least one of $R^a$ to $R^f$ is a hydrogen atom. For similar reasons, it is more preferable that at least one of $R^a$ to $R^{Cc}$ is a hydrogen atom and at least one of $R^d$ to $R^f$ is a hydrogen atom. Methyl group is preferable as the alkyl group.

The metallocene complex represented by general formula (III) includes a silyl ligand [—SiX'$_3$]. X' included in the silyl ligand [—SiX'$_3$] is a group selected from the group consisting of hydrogen atom, halogen atom, alkoxy, thiolate, amide, silyl, and a $C_{1-20}$ hydrocarbon groups. Examples of the alkoxy group include: aliphatic alkoxy group such as methoxy, ethoxy, propoxy, n-butoxy, isobutoxy, sec-butoxy, tert-butoxy, and the like; and aryloxy group such as phenoxy, 2,6-di-tert-butylphenoxy, 2,6-diisopropylphenoxy, 2,6-dineopentylphenoxy, 2-tert-butyl-6-isopropylphenoxy, 2-tert-butyl-6-neopentylphenoxy, 2-isopropyl-6-neopentylphenoxy, and the like. 2,6-di-tert-butylphenoxy is preferable as the alkoxy group among these examples.

$Cp^{R'}$ is a substituted cyclopentadienyl, a substituted indenyl or a substituted fluorenyl group in the half metallocene cation complex represented by general formula (IV). A substituted indenyl group is preferable as $Cp^{R'}$ among these examples.

In general formula (IV), $Cp^{R'}$ having a substituted cyclopentadienyl ring as the base skeleton is represented as $C_5H_{5-X}R_X$, wherein X is an integer in the range of 1 to 5, preferably in the range of 1 to 4; Rs preferably each independently represent hydrocarbyl or metalloid group; and the number of carbon atoms of the hydrocarbyl group is preferably in the range of 1 to 20, more preferably in the range of 1 to 10, and further more preferably in the range of 1 to 8. Specifically, preferable examples of the hydrocarbyl group include methyl, ethyl, tert-butyl, phenyl, benzyl groups and the like. Examples of metalloid of the metalloid group include germyl Ge, stannyl Sn, and silyl Si. The metalloid group preferably includes a hydrocarbyl group which is defined in the same manner as the aforementioned hydrocarbyl group. Specific examples of the metalloid group include trimethylsilyl group and the like. Specific examples of $Cp^{R'}$ having a substituted cyclopentadienyl ring as the base skeleton include compounds represented by the following structural formulae:

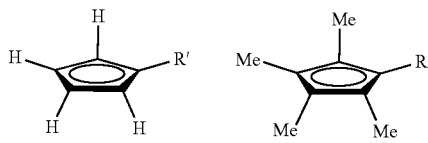

(In these structural formulae, R' represents methyl or ethyl group and R represents hydrogen atom, methyl or ethyl group.)

$Cp^{R'}$ having a substituted indenyl ring as the base skeleton, as well as preferable examples thereof, in general formula (IV) is defined in the same manner as $Cp^R$ in general formula (II) and $Cp^R$ in general formula (III).

$Cp^{R'}$ having a substituted fluorenyl ring as the base skeleton in general formula (IV) is represented as $C_{13}H_{9-X}R_X$ or $C_{13}H_{17-X}R^X$, wherein X is an integer in the range of 1 to 9 or 1 to 17; Rs preferably each independently represent hydrocarbyl or metalloid group; and the number of carbon atoms of the hydrocarbyl group is preferably in the range of 1 to 20, more preferably in the range of 1 to 10, and further more preferably in the range of 1 to 8. Specifically, preferable examples of the hydrocarbyl group include methyl, ethyl, tert-butyl, phenyl, benzyl groups and the like. Examples of metalloid of the metalloid group include germyl Ge, stannyl Sn, and silyl Si. The metalloid group preferably includes a hydrocarbyl group which is defined in the same manner as the aforementioned hydrocarbyl group. Specific examples of the metalloid group include trimethylsilyl group and the like.

In general formula (IV), X is a group selected from the group consisting of hydrogen atom, halogen atom, alkoxy, thiolate, amide, silyl, and a $C_{1-20}$ hydrocarbon groups.

Acceptable examples of the halogen atom represented by X in general formula (IV) include fluorine, chlorine, bromine and iodine atoms. Chlorine or bromine atom is preferable.

In general formula (IV), examples of the alkoxy group represented by X include: aliphatic alkoxy group such as methoxy, ethoxy, propoxy, n-butoxy, isobutoxy, sec-butoxy, tert-butoxy, and the like; and aryloxy group such as phenoxy, 2,6-di-tert-butylphenoxy, 2,6-diisopropylphenoxy, 2,6-dineopentylphenoxy, 2-tert-butyl-6-isopropylphenoxy, 2-tert-butyl-6-neopentylphenoxy, 2-isopropyl-6-neopentylphenoxy, and the like. 2,6-di-tert-butylphenoxy is preferable as the alkoxy group among these examples.

Examples of the thiolate group represented by X in general formula (IV) include: aliphatic thiolate group such as thiomethoxy, thioethoxy, thiopropoxy, n-thiobutoxy, thoisobutoxy, sec-thiobutoxy, tert-thiobutoxy, and the like; and arylthiolate group such as thiophenoxy, 2,6-di-tert-butylthiophenoxy, 2,6-diisopropylthiophenoxy, 2,6-dineopentylthiophenoxy, 2-tert-butyl-6-isopropylthiophenoxy, 2-tert-butyl-6-thioneopentylphenoxy, 2-isopropyl-6-thioneopentylphenoxy, 2,4,6-triisopropylthiophenoxy, and the like. 2,4,6-triisopropylthiophenoxy is preferable as the thiolate group among these examples.

Examples of the amide group represented by X in general formula (IV) include: aliphatic amide group such as dimethylamide, diethylamide, diisopropylamide, and the like; arylamide group such as phenylamide, 2,6-di-tert-butylphenylamide, 2,6-diisopropylphenylamide, 2,6-dineopentylphenylamide, 2-tert-butyl-6-isopropylphenylamide, 2-tert-butyl-6-neopentylphenylamide, 2-isopropyl-6-neopentylphenylamide, 2,4,6-tri-tert-butylphenylamide, and the like; and bis(trialkylsily)amide such as bis(trimethylsilyl)amide and the like. Bis(trimethylsilyl)amide group is preferable as the amide group among these examples.

Examples of the silyl group represented by X in general formula (IV) include trimethylsilyl, tris(trimethylsilyl)silyl, bis(trimethylsilyl)methylsilyl, trimethylsilyl(dimethyl)silyl, (triisopropylsilyl)bis(trimethylsilyl)silyl, and the like. Tris(trimethylsilyl)silyl group is preferable as the silyl group among these examples.

Specific examples of the $C_{1-20}$ hydrocarbon group represented by X in general formula (IV) include: normal/branched aliphatic hydrocarbon group such as methyl, ethyl, n-propyl, isopropyl, n-butyl, isobutyl, sec-butyl, tert-butyl, neopentyl, hexyl, octyl, and the like; aromatic hydrocarbon group such as phenyl, tolyl, naphthyl, and the like; aralykyl group such as benzyl, and the like; a hydrocarbon group containing silicon atom such as trimethylsilylmethyl, bis(trimethylsilyl)methyl; and the like. Methyl, ethyl, isobutyl, trimethylsilylmethyl, and the like are preferable as the $C_{1-20}$ hydrocarbon group among these examples.

Bistrimethylsilylamide or a $C_{1-20}$ hydrocarbon group is preferable as X in general formula (IV).

Examples of the non-coordinating anion represented by [B]$^-$ in general formula (IV) include quadrivalent boron anion. Specific examples of the quadrivalent boron anion include tetraphenylborate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl)borate, tetra(xylyl)borate, triphenyl(pentafluorophenyl)borate, [tris(pentafluorophenyl)phenyl]borate, tridecahydride-7,8-dicarbaundecaborate, and the like. Tetrakis(pentafluorophenyl)borate is preferable as the quadrivalent boron anion among these examples.

The metallocene complexes represented by general formulae (II) and (III) and the half metallocene cation complex represented by general formula (IV) each further include 0 to 3, preferably 0 to 1, neutral Lewis base L. Examples of the neutral Lewis base L include tetrahydrofuran, diethyl ether, dimethylaniline, trimethylphosphine, lithium chloride, neutral olefins, neutral diolefins, and the like. The neutral Lewis bases L may be of either the same type or different types when the complex includes a plurality of neutral Lewis bases L.

The metallocene complexes represented by general formulae (II) and (III) and the half metallocene cation complex represented by general formula (IV) may each exist as any of monomer, dimer or another type of multimer.

Preferable examples of the rare earth element-containing compound (A) include:

a compound represented by following general formula (V):

$$M\text{-}(NQ^1)(NQ^2)(NQ^3) \quad (V)$$

(In general formula (V), M represents a lanthanoid element, scandium, or yttrium; and $NQ^1$, $NQ^2$ and $NQ^3$ represent amide groups which may be of the same type or different types and each essentially include a M-N bond); and a compound represented by following general formula (VI):

$$M\text{-}(NQ^1)(NQ^2)(Cp^R) \quad (VI)$$

(In general formula (VI), M represents a lanthanoid element, scandium, or yttrium $NQ^1$ and $NQ^2$ represent amide groups which may be of the same type or different types and each essentially include a M-N bond; and $Cp^R$ represents a substituted indenyl).

The core metal M in each of general formulae (V) and (VI) is a lanthanoid element, scandium or yttrium. The lanthanoid elements include the fifteen elements having atomic numbers 57-71 in the periodic table and any of these elements is acceptable. Preferable examples of the core metal M include samarium Sm, neodymium Nd, praseodymium Pr, gadolinium Gd, cerium Ce, holmium Ho, scandium Sc, and yttrium Y.

Examples of the amide group represented by $NQ^1$, $NQ^2$ and $NQ^3$ in general formula (V) and $NQ^1$ and $NQ^2$ in general formula (VI) include: aliphatic amide group such as dimethylamide, diethylamide, diisopropylamide, and the like; arylamide group such as phenylamide, 2,6-di-tert-butylphenylamide, 2,6-diisopropylphenylamide, 2,6-dineopentylphenylamide, 2-tert-butyl-6-isopropylphenylamide, 2-tert-buty-6-neopentylphenylamide, 2-isopropyl-6-neopentylphenylamide, 2,4,6-tert-butylphenylamide, and the like; bisdialkylsilylamide such as bisdimethylsilylamide; bistrialkylsilylamide such as bistrimethylsilylamide; and the like. Bisdimethylsilylamide and bistrimethylsilylamide are preferable as the amide group among these examples.

In general formula (VI), $Cp^R$ represents a substituted indenyl. $Cp^R$ having an indenyl ring as the base skeleton may be represented as $C_9H_{7-X}R_X$ or $C_9H_{11-X}R_X$, wherein X represents the number of the substituent group on the substituted indenyl group and is an integer in the range of 1 to 7 or 1 to 11; Rs preferably each independently represent hydrocarbyl or metalloid group; and the number of carbon atoms of the hydrocarbyl group is preferably in the range of 1 to 20, more preferably in the range of 1 to 10, and further more preferably in the range of 1 to 8. Specifically, preferable examples of the hydrocarbyl group include methyl, ethyl, tert-butyl, phenyl, benzyl groups and the like. Examples of metalloid of the metalloid group include germyl Ge, stannyl Sn, and silyl Si. The metalloid group preferably includes a hydrocarbyl group which is defined in the same manner as the aforementioned hydrocarbyl group. Specific examples of the metalloid group include trimethylsilyl group, tert-butyldimethylsilyl group, and the like. Specific examples of the substituted indenyl include 2-phenylindenyl, 2-methylindenyl, 1-methyl-2-phenylindenyl, 1,3-bis(tert-butyldimethylsilyl)indenyl, 1-ethyl-2-phenylindenyl, 1-benzyl-2-phenylindenyl, and the like.

The rare earth element-containing component (A) is preferably a salt soluble in a hydrocarbon solvent, and specific examples of the salt include carboxylate salt, alkoxide, β-diketone complex, phosphate salt and phosphite salt of the aforementioned rare earth element. Carboxylate salt and phosphate salt are preferable and carboxylate salt is particularly preferable among these examples.

Examples of the hydrocarbon solvent include: a $C_{4-10}$ saturated aliphatic hydrocarbon such as butane, pentane, hexane, heptane; a $C_{5-20}$ saturated alicyclic hydrocarbon such as cyclopentane, cyclohexane; a monoolefin such as 1-butene, 2-butene: an aromatic hydrocarbon such as benzene, toluene and xylene: a halogenated hydrocarbon such as methylene chloride, chloroform, trichloroethylene, perchloroethylene, 1,2-dichloroethane, chlorobenzene, bromobenzene, chlorotoluene; and the like.

Examples of the carboxylate salt of the rare earth element include a compound represented by following general formula (VII):

$$(R^7\text{—}COO)_3M \quad (VII)$$

(In general formula (VII), $R^7$ represents a $C_{1-20}$ hydrocarbon group; and M represents one of the rare earth elements having atomic numbers 57-71 in the periodic table.) $R^7$ is a saturated/unsaturated, normal/branched/cyclic, preferably alkyl/alkenyl group. The carboxyl group is bonded to a primary, secondary or tertiary carbon atom. Specific examples of the carboxylate salt include salts of octanoic acid, 2-ethylhexanoic acid, oleic acid, neodecanoic acid, stearic acid, benzoic acid, naphthenic acid, versatic acid (the product name of a carboxylic acid in which a carboxyl group is bonded to a tertiary carbon atom, manufactured by Shell Chemicals), and the like. Salts of 2-ethylhexanoic acid, neodecanoic acid, naphthenic acid and versatic acid are preferable as the carboxylate salt among these examples.

Examples of the alkoxide of the rare earth element include a compound represented by following general formula (VIII):

$$(R^8O)_3M \quad (VIII)$$

(In general formula (VIII), $R^8$ represents a $C_{1-20}$ hydrocarbon group; and M represents one of the rare earth elements having atomic numbers 57-71 in the periodic table.) Examples of the alkoxy group represented by $R^8O$ include 2-ethylhexylalkoxy, oleylalkoxy, stearylalkoxy, phenoxy, benzylalkoxy groups, and the like. 2-ethylhexylalkoxy group and benzylalkoxy group are preferable as the alkoxy group among these examples.

Examples of the β-diketone complex of the rare earth element include acetylacetone complex, benzoylacetone complex, propionitrile acetone complex, valerylacetone complex, ethylacetylacetone complex of the rare earth element, and the like. Acetylacetone complex and ethylacetylacetone complex are preferable as the β-diketone complex among these examples.

Examples of the phosphate salt and the phosphite salt of the rare earth element include salts of the aforementioned rare earth element and bis(2-ethylhexyl)phosphate, bis(1-methylheptyl)phosphate, bis(p-nonylphenyl)phosphate, bis(polyethyleneglycol-p-nonylphenyl)phosphate, (1-methylheptyl)(2-ethylhexyl)phosphate, (2-ethylhexyl)(p-nonylphenyl)phosphate, mono-2-ethylhexyl(2-ethylhexyl) phosphonate, mono-p-nonylphenyl(2-ethylhexyl)phosphonate, bis(2-ethylhexyl)phosphite, bis(1-methylheptyl)phosphite, bis(p-nonylphenyl)phosphite, (1-methylheptyl)(2-ethylhexyl)phosphite, (2-ethylhexyl)(p-nonylphenyl) phosphite, and the like. Salts of the aforementioned rare earth element and bis(2-ethylhexyl)phosphate, bis(1-methylheptyl)phosphate, mono-2-ethylhexyl(2-ethylhexyl) phosphonate, and bis(2-ethylhexyl)phosphite are preferable among these examples.

A mole quantity of the rare earth element-containing component (A) is preferably ≤1/1,000 and more preferably ≤1/2,000 of a mole quantity of the conjugated diene compound used for the copolymer. It is possible to significantly reduce an amount of catalyst residue in the copolymer by setting a mole ratio of the two mole quantities to be in the aforementioned ranges. It is then possible to further improve durability of the rubber composition by blending the copolymer in the rubber composition.

A concentration of the rare earth element-containing component (A) in the catalyst composition is preferably in the range of 0.0001 mol/L to 0.2 mol/L in a polymerization reaction system of the present disclosure.

The organic metal compound (B) for use in the catalyst composition is represented by the following general formula (I):

$$YR^1_a R^2_b R^3_c \quad (I)$$

(In general formula (I), Y represents a metal selected from the group 1, 2, 12 and 13 elements in the periodic table, $R^1$ and $R^2$ each represent a $C_{1-10}$ hydrocarbon group or a hydrogen atom, $R^3$ represents a $C_{1-10}$ hydrocarbon group, $R^1$, $R^2$ and $R^3$ may be of either the same type as or different types, a=1 and b=c=0 when Y is a metal selected from the group 1 elements in the periodic table, a=b=1 and c=0 when Y is a metal selected from the groups 2, 12 elements in the periodic table, and a=b=c=1 when Y is a metal selected from the group 13 elements in the periodic table.):

In the general formula (I), specific examples of the $C_{1-10}$ hydrocarbon group represented by $R^1$, $R^2$ and $R^3$ include: a normal/branched aliphatic hydrocarbon group such as methyl, ethyl, n-propyl, isopropyl, n-butyl, isobutyl, sec-butyl, tert-butyl, neopentyl, hexyl, octyl group, and the like: an aromatic hydrocarbon group such as phenyl, tolyl, naphthyl group, and the like: an aralkyl group such as benzyl group; and the like. Methyl, ethyl, isobutyl groups and the like are preferable among these examples.

The organic metal component (B) is preferably an organic aluminum compound represented by general formula (IX):

$$AlR^1R^2R^3 \quad (IX)$$

(In general formula (IX), $R^1$ and $R^2$ each represent a $C_{1-10}$ hydrocarbon group or a hydrogen atom and $R^3$ represents a $C_{1-10}$ hydrocarbon group, wherein $R^1$, $R^2$ and $R^3$ may be of either the same type or different types.)

The organic aluminum compound corresponds to a compound represented by general formula (I) in which Y is Al and a=b=c=1.

Examples of the organic aluminum compound represented by general formula (IX) include trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, trioctylaluminum hydrogenated diethylaluminum, hydrogenated di-n-propylaluminum, hydrogenated di-n-butylaluminum, hydrogenated diisobutylaluminum, hydrogenated dihexylaluminum, hydrogenated diisohexylaluminum, hydrogenated dioctylaluminum, hydrogenated diisooctylaluminum, ethylaluminum dihydride, n-propylaluminum dihydride, isobutylaluminum dihydride, and the like. Triethylaluminum, triisobutylaluminum, hydrogenated diethylaluminum and hydrogenated diisobutylaluminum are preferable as the organic aluminum compound among these examples.

Either a single type or combination of two or more types of the aforementioned examples may be used as the organic metal compound (B).

A content of the organic metal compound (B) is preferably at least two times and more preferably 3 to 10,000 times as much as the content of the rare earth element-containing component (A) when compared in mol.

The ionic compound (C) which can be used for the catalyst composition is constituted of a non-coordinating anion and a cation. Examples of the ionic compound (C) include an ionic compound or the like capable of being reacted with the rare earth element-containing component (A) and generating a cationic transition metal compound. Examples of the non-coordinating anion include quadrivalent boron anion such as tetraphenylborate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl)borate, tetra(xylyl)borate, triphenyl(pentafluorophenyl)borate, [tris(pentafluorophenyl)phenyl]borate, tridecahydride-7,8-dicarbaundecaborate, and the like. Tetrakis(pentafluorophenyl)borate is preferable as the quadrivalent boron anion among these examples.

Examples of the cation include carbonium cation, oxonium cation, ammonium cation, phosphonium cation, cycloheptatrienyl cation, ferrocenium cation having transition metal, and the like. Specific examples of the carbonium cation include trisubstituted carbonium cation such as triphenylcarbonium cation, tri(substituted phenyl)carbonium cation, and the like. Specific examples of the tri(substituted phenyl)carbonium cation include tri(methylphenyl)carbonium cation, tri(dimethylphenyl)carbonium cation, and the like. Specific examples of the ammonium cation include: trialkylammonium cation such as trimethylammonium cation, triethylammonium cation, tripropylammonium cation, tributylammonium cation (e.g. tri(n-butyl)ammonium cation); N,N-dialkylanilinium cation such as N,N-dimethylanilinium cation, N,N-diethylanilinium cation, N,N-2,4,6-pentamethylanilinium cation; dialkylammonium cation such as diisopropylammonium cation, dicyclohexylammonium cation, and the like. Specific examples of phosphonium cation include triarylphosphonium cation such as triphenylphosphonium cation, tri(methylphenyl)phosphonium cation, tri(dimethylphenyl)phosphonium cation, and the like.

Accordingly, a compound as a combination of a non-coordinating anion and a cation respectively selected from the aforementioned examples is preferably used as the ionic compound (C). Specifically, N,N-dimethylanilinium tetrakis (pentafluorophenyl)borate, triphenylcarbonium tetrakis (pentafluorophenyl)borate, and the like are preferable as the ionic compound (C).

Either a single type or combination of two or more types of the aforementioned examples may be used as the ionic compound (C).

A content of the ionic compound (C) in the catalyst composition is preferably 0.1 to 10 times, more preferably approximately 1 times, as much as the content of the rare earth element-containing component (A) when compared in mol.

Examples of the halogen compound (D) which can be used for the catalyst composition include a Lewis acid, a complex compound of a metal halide and a Lewis base, and an organic compound containing an active halogen. The halogen compound (D) is capable of being reacted with the aforementioned rare earth element-containing compound (A), for example, to generate a cationic transition metal compound, a halide transition metal compound, or a compound of which transition metal center is deficient in charge. Considering stability in the atmosphere in particular, a complex compound of a metal halide and a Lewis base can be more suitably used as the halogen compound (D) than a Lewis acid. Further, a compound including two or more halogen atoms in one molecule thereof is more preferable as the halogen compound (D) than a compound including only one halogen atom in one molecule thereof because the former is more reactive and thus requires less usage amount than the latter.

Examples of the Lewis acid include a boron-containing halogen compound such as $B(C_6F_5)_3$, an aluminum-containing halogen compound such as $Al(C_6F_5)_3$, and a halogen compound containing a group 4, 6, 13, 14, 15 element in the periodic table. Preferable examples of the Lewis acid include an aluminum halide and an organic metal halide. Chlorine or bromine is preferable as the halogen element.

Specific examples of the Lewis acid include methylaluminum dibromide, methylaluminum dichloride, ethylaluminum dibromide, ethylaluminum dichloride, butylaluminum dibromide, butylaluminum dichloride, dimethylaluminum bromide, dimethylaluminum chloride, diethylaluminum bromide, diethylaluminum chloride, dibutylaluminum bromide, dibutylaluminum chloride, methylaluminum sesquibromide, methylaluminum sesquichloride, ethylaluminum sesquibromide, ethylaluminum sesquichloride, dibutyltin dichloride, aluminum tribromide, antimony trichloride, antimony pentachloride, phosphorus trichloride, phosphorus pentachloride, tin tetrachloride, titanium tetrachloride, tungsten hexachloride, and the like. Diethylaluminum chloride, ethylaluminum sesquichloride, ethylaluminum dichloride, diethylaluminum bromide, ethylaluminum sesquibromide, and ethylaluminum dibromide are particularly preferable as the Lewis acid among these examples.

Examples of the metal halide which, together with a Lewis base, constitutes a complex compound include beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper bromide, copper iodide, silver chloride, silver bromide, silver iodide, gold chloride, gold iodide, gold bromide, and the like. Magnesium chloride, calcium chloride, barium chloride, manganese chloride, zinc chloride and copper chloride are preferable as the metal halide among these examples. Magnesium chloride, manganese chloride, zinc chloride and copper chloride are particularly preferable.

Further, preferable examples of the Lewis base constituting, together with the metal halide, a complex compound include a phosphorus compound, a carbonyl compound, a nitrogen compound, an ether compound, alcohol, and the like. Specifically, acceptable examples of the Lewis base include tributyl phosphate, tris (2-ethylhexyl) phosphate, triphenyl phosphate, tricresyl phosphate, triethylphosphine, tributylphosphine, triphenylphosphine, diethylphosphinoethane, diphenylphosphinoethane, acetylacetone, benzoylacetone, propionitrileacetone, valerylacetone, ethylacetylacetone, methyl acetoacetate, ethyl acetoacetate, phenyl acetoacetate, dimethyl malonate, diethyl malonate, diphenyl malonate, acetic acid, octanoic acid, 2-ethyl-hexanoic acid, oleic acid stearic acid, benzoic acid, naphthenic acid, versatic acid, triethylamine. N,N-dimethylacetoamide, tetrahydrofuran, diphenyl ether, 2-ethyl-hexyl alcohol, oleyl alcohol, stearyl alcohol, phenol, benzyl alcohol, 1-decanol, lauryl alcohol, and the like. Tris (2-ethylhexyl) phosphate, tricresyl phosphate, acetylacetone, 2-ethyl-hexanoic acid, versatic acid, 2-ethyl-hexyl alcohol, I-decanol, and lauryl alcohol are preferable as the Lewis base among these examples.

0.01 to 30 mol (preferably 0.5 to 10 mol) per 1 mol of the metal halide, of the aforementioned Lewis base, is reacted with the metal halide. Metals remaining in the copolymer can be reduced by using a reactant thus obtained by the reaction between the metal halide and the Lewis base.

Examples of the organic compound containing active halogen, as the halogen compound (D), include benzyl chloride and the like.

Either a single type or combination of two or more types of the aforementioned examples may be used as the halogen compound (D).

A content of the halogen compound (D) in the catalyst composition is preferably 0 to 5 times, more preferably 1 to 5 times, as much as the content of the rare earth element-containing component (A) when compared in mol.

The cyclic non-conjugated olefin compound (E) for use in the catalyst composition represents an alicyclic unsaturated hydrocarbon compound having one or more carbon-carbon double bond. The cyclic non-conjugated olefin compound (E) excludes an aromatic vinyl compound. The number of the carbon atoms of the cyclic non-conjugated olefin compound (E) is preferably 3 to 10, although type of the compound (E) is not particularly restricted otherwise. Examples of the cyclic non-conjugated olefin compound (E) include: cycloalkene such as cyclopentene, cyclohexene, cycloheptene, cyclooctene, methylcyclopentene, methylcyclohexene, methylcycloheptene, methylcyclooctene, ethylcyclopentene, ethylcyclohexene, ethylcycloheptene, ethylcyclooctene, dimethylcyclopentene, dimethylcyclohexene, dimethylcycloheptene, dimethylcyclooctene; and a compound having a crosslinking structure such as norbornene (which is occasionally referred to as "2-norbornene"), 5-methyl-2-norbornene, 5-ethyl-2-norbornene, 5-n-butyl-2-norbornene, 5-n-hexyl-2-norbornene, 5-n-decyl-2-norbornene, 5-cyclohexyl-2-norbornene, 5-ethylidene-2-norbornene, 5-vinyl-2-norbornene, 5-phenyl-2-norbornene, 5-benzyl-2-norbornene. Norbornene is preferable among these examples. The cyclic non-conjugated olefin 1 to compound (E) is not incorporated into the copolymer.

A content of the cyclic non-conjugated olefin compound (E) in the catalyst composition is preferably 1 to 100,000 times, more preferably 5 to 50,000 times, as much as the content of the rare earth element-containing component (A) when compared in mol.

The catalyst composition may further include aluminoxane (F). The aluminoxane (F) is a compound obtained by bringing an organic aluminum compound into contact with a condensing agent. Examples of the aluminoxane (F) include a chain aluminoxane or a cyclic aluminoxane having repeating units, represented by following general formula (X):

(—Al($R^{10}$)O—)  (X)

(In general formula (X), $R^{10}$ represents a $C_{1-10}$ hydrocarbon group; some of the hydrocarbon groups may be substituted with halogen atom and/or alkoxy group; and polymerization degree of the repeating units is preferably ≥5 and more preferably ≥10). Specific examples of $R^{10}$ include methyl, ethyl, propyl, isobutyl groups and the like. Methyl group is preferable as $R^{10}$ among these examples. Examples of the organic aluminum compound used as a raw material of the aluminoxane (F) include trialkylaluminum such as trimethylaluminum, triethylaluminum, tributylaluminum, triisobutylaluminum, and a mixture thereof. Trimethylaluminum is particularly preferable among these examples as the organic aluminum compound. An aluminoxane obtained by using a mixture of trimethylaluminum and tributylaluminum as the raw material can be suitably used, for example.

Either a single type or combination of two or more types of the aforementioned examples may be used as the aluminoxane (F).

Provided that "Al/M" represents an element ratio of the aluminum element (Al) of aluminoxane with respect to the rare earth element (M) constituting the rare earth element-containing component (A), a content of the aluminoxane (F) in the catalyst composition is preferably set such that the element ratio Al/M is in the range of 10 to 10,000 approximately.

The production method for a copolymer of the present disclosure includes a process of copolymerizing an acyclic non-conjugated olefin compound and a conjugated diene compound under the presence of the aforementioned catalyst composition (which process will occasionally be referred to as "the copolymerization process" hereinafter). In a case where the copolymer is to contain an aromatic vinyl unit, as well, the acyclic non-conjugated olefin compound, the conjugated diene compound and an aromatic vinyl compound are copolymerized under the presence of the aforementioned catalyst composition in the copolymerization process. The production method for a copolymer of the present disclosure may further include, in addition to the copolymerization process, coupling process, rinsing process and other processes according to necessity.

Any polymerization method such as solution polymerization, suspension polymerization, liquid-phase bulk polymerization, emulsion polymerization, vapor-phase polymerization, or solid-phase polymerization can be used for the copolymerization process. In a case where a solvent is used in a relevant copolymerization reaction, any solvent is acceptable as long as the solvent is inactive in the copolymerization reaction. Examples of the solvent include toluene, hexane (e.g. cyclohexane, n-hexane), and the like.

In the production method for a copolymer of the present disclosure, the copolymerization process may be carried out by either a single step or multiple (i.e. two or more) steps. The copolymerization process carried out by a single step represents a process of effecting copolymerization by bringing all monomers to be polymerized to simultaneous reactions. The copolymerization process carried out by multiple steps represents a process of effecting copolymerization by first bringing a portion/all of one/two or more monomer(s) to reactions, to form a polymer or copolymer (the first polymerization step), and then adding the remaining portion(s) of the first polymerization step monomer(s) and the remaining type of monomer(s) which have not been used in the first polymerization step, to the polymer or copolymer thus formed, to complete copolymerization (the second polymerization step to the final polymerization step).

It is possible, under the presence of the catalyst composition, to control bond contents (cis-1,4 bond content, trans-1,4 bond content, 3,4 vinyl bond content, and 1,2 vinyl content) in the entire conjugated diene units of the copolymer thus manufactured and contents of the units derived from the respective monomers (that is, copolymerization ratios of the respective monomers) by controllably changing the charging order and charging amounts of the respective monomers when they are charged into a reaction vessel, and other reaction conditions.

In the production method for a copolymer of the present disclosure, the copolymerization process preferably includes charging the cyclic non-conjugated olefin compound (E) into a reaction vessel at the stage of charging the conjugated diene compound into the reaction vessel for the first time. It is possible to maximize an effect caused by the cyclic non-conjugated olefin compound (E) and make chain lengths of the acyclic non-conjugated olefin units more uniform than otherwise by charging the cyclic non-conjugated olefin compound (E) into a reaction vessel at the stage of charging the conjugated diene compound into the reaction vessel for the first time. In this regard, charging of the acyclic non-conjugated olefin compound into the reaction vessel may be carried out at any of the following stages: before charging the conjugated diene compound into the reaction vessel for the first time; after charging the conjugated diene compound into the reaction vessel for the first time; when (i.e. simultaneous with) charging the conjugated diene compound into the reaction vessel for the first time. Further, in a case where an aromatic vinyl compound is used, charging of the aromatic vinyl compound into the reaction vessel may be carried out at any of the following stages: before charging the conjugated diene compound into the reaction vessel for the first time; after charging the conjugated diene compound into the reaction vessel for the first time; when (i.e. simultaneous with) charging the conjugated diene compound into the reaction vessel for the first time.

In the production method for a copolymer of the present disclosure, the copolymerization process is preferably carried out in an atmosphere of inert gas, desirably in an atmosphere of nitrogen gas or argon gas. The temperature in the polymerization process, although it is not particularly restricted, is preferably in the range of −100° C. to 200° C. and may be around the room temperature, for example. Too high reaction temperature may adversely affect selectivity of cis-1,4 bond of the conjugated diene unit of the copolymer. Pressure during the polymerization process is preferably in the range of 0.1 MPa to 10.0 MPa in terms of capturing a sufficient amount of an acyclic non-conjugated olefin compound into the polymerization reaction system. Reaction time of the polymerization process is preferably in the range of 1 second to 10 days, for example, although it is not particularly restricted. The reaction time may be appropriately set depending on conditions such as a micro structure desired for the resulting copolymer, types of the respective monomers, charging amounts and charging order of the monomers, type of the catalyst, reaction temperature, and the like. The copolymerization reaction can be stopped by using a polymerization terminator such as methanol, ethanol, isopropanol in the copolymerization process.

The coupling process is a process of carrying out a reaction (a coupling reaction) for modifying at least a portion, e.g. a terminal end, of a polymer chain of the copolymer obtained by the copolymerization process described above. The coupling reaction is preferably carried out when a conversion ratio in the copolymerization reaction has reached 100%.

Type of a coupling agent for use in the coupling reaction is not particularly restricted and can be appropriately selected according to the purpose. Examples of the coupling agent include: (i) a tin-containing compound such as bis (maleic acid-1-octadecyl)dioctyl tin (IV); (ii) an isocyanate compound such as 4,4'-diphenylmethane diisocyanate; (iii) an alkoxysilane compound such as glycidyl propyltrimethoxysilane; and the like. Either a single type or combination of two or more types of these examples may be used as the coupling agent. Bis(maleic acid-1-octadecyl)dioctyl tin (IV) is preferable as the coupling agent among these examples in terms of high reaction efficiency and relatively little gel generation.

Rinsing process is a process of rinsing a copolymer obtained by the aforementioned copolymerization process. Type of a solvent for use in the rinsing process is not particularly restricted and can be appropriately selected according to the purpose. Examples of the solvent include methanol, ethanol, isopropanol, and the like. An acid (such as hydrochloric acid, sulfuric acid, nitric acid) may be added to such a solvent as described above in the rinsing process when a Lewis acid-derived catalyst is used as the polymerization catalyst, in particular. An amount to be added, of the acid, is preferably 15 mol % or less with respect to the solvent. Addition of the acid by an amount exceeding 15 mol % with respect to the solvent may cause the acid to remain in the copolymer, possibly adversely affecting mixture, kneading and a vulcanization reaction. An amount of catalyst residue in the copolymer can be decreased to an appropriate level by the rinsing process.

<Rubber Composition>

A rubber composition of the present disclosure characteristically includes the aforementioned copolymer. The rubber composition of the present disclosure therefore exhibits high elastic modulus, as well as high resistance to crack growth and excellent weatherproofness.

The rubber composition of the present disclosure includes the aforementioned 1 to copolymer as a rubber component and optionally may further include other rubber components, a filler, a crosslinking agent and other components.

Types of rubber components other than the copolymer of the present disclosure are not particularly restricted and can be appropriately selected according to the purpose. Examples of other rubber components include natural rubber (NR), polyisoprene rubber (IR), polybutadiene rubber (BR), acrylonitrile-butadiene rubber (NBR), chloroprene rubber, ethylene-propylene rubber (EPM), ethylene-propylene-nonconjugated diene rubber (EPDM), polysulfide rubber, silicone rubber, flurorubber, urethane rubber, and the like. Either a single type or combination of two or more types of these examples may be used as the other rubber components.

The rubber composition can improve reinforcing properties thereof by including a filler therein. Type of the filler is not particularly restricted and examples thereof include carbon black, silica, aluminum hydroxide, clay, alumina, talc, mica, kaolin, glass balloons, glass beads, calcium carbonate, magnesium carbonate, magnesium hydroxide, magnesium oxide, titanium oxide, potassium titanate, barium sulfate, and the like. Carbon black is preferably used among these examples. Either a single type or combination of two or more types of these examples may be used as the filler.

A content of the filler, although it is not particularly restricted and appropriately selected according to the purpose, is preferably 10 to 100 parts by mass, more preferably 20 to 80 parts by mass, and most preferably 30 to 60 parts by mass, with respect to 100 parts by mass of the rubber component. The content of filler, of ≥10 parts by mass with respect to 100 parts by mass of the rubber component, ensures an effect of improving the reinforcing property of the rubber composition by the filler. The content of filler, of ≤100 parts by mass with respect to 100 parts by mass of the rubber component, ensures good workability of the rubber composition.

Type of the crosslinking agent is not particularly restricted and can be appropriately selected according to the purpose. Examples of the crosslinking agent include sulfur-based crosslinking agent, organic peroxide-based crosslinking agent, inorganic crosslinking agent, polyamine crosslinking agent, resin crosslinking agent, sulfur compound-based crosslinking agent, oxime-nitrosamine-based crosslinking agent and the like. Sulfur-based crosslinking agent (sulfur-based vulcanizing agent) is preferably applied to a rubber composition for a tire among these examples.

A content of the crosslinking agent is not particularly restricted and can be appropriately selected according to the purpose but is preferably in the range of 0.1 to 20 parts by mass with respect to 100 parts by mass of the rubber component.

A vulcanization accelerator may be used in combination with the vulcanizing agent. Examples of the vulcanization accelerator include guanidine based, aldehyde-amine based, aldehyde-ammonium based, thiazole based, sulfonamide based, thiourea based, thiuram based, dithiocarbamate based, xanthate based compounds, and the like.

Further, other known additives such as a softener, a vulcanization accelerator aid, a coloring agent a fire retardant, a lubricant, a foaming agent, a plasticizer, a processing aid, an antioxidant, an antiaging agent, a scorch protection agent, a UV protection agent an antistatic agent, an anticoloring agent, and the like may optionally be used in the rubber composition of the present disclosure according to the necessity.

The rubber composition of the present disclosure is applicable to, other than a tire described below, a rubber damper, quake-absorbing rubber, a belt such as a conveyor belt, a rubber crawler, hoses of various types, and the like.

(Tire)

A tire of the present disclosure characteristically employs the aforementioned rubber composition. The tire of the present disclosure therefore exhibits high durability and excellent weatherproofness.

A portion of a tire to which the rubber composition of the present disclosure is to be applied is not particularly limited and the tire portion can be appropriately selected according to the purpose. Examples of the tire portion include a tread, a base tread, a sidewall, side reinforcing rubber, a bead filler, and the like.

The tire of the present disclosure can be manufactured by a conventional method. For example, a desired tire such as a pneumatic tire can be manufactured by: sequentially laminating members generally for use in tire production such as a carcass layer, a belt layer, a tread layer made of unvulcanized rubber composition and/or cords on a tire building drum removing the drum, to obtain a green tire; and subjecting the green tire to heating and vulcanization according to the conventional method.

Examples

The present disclosure will be described further in detail by Examples hereinafter. The present disclosure is not restricted by any means by these Examples.

(Synthesis of Copolymer a)

Copolymer a was synthesized by: charging 70 g of styrene, 90 g of a toluene solution containing 22 g of 1,3-butadiene, and 630 g of toluene into a thoroughly dry 2000 mL pressure-resistant stainless reactor;

charging, on the other hand, 0.125 mmol of mono(1,3-bis(tert-butyldimethylsilyl)indenyl) gadolinium bis(bis(dimethylsilyl)amide) complex $\{1,3\text{-}(t\text{-}BuMe_2Si)_2C_9H_5Gd[N(SiHMe_2)_2]_2\}$, 0.125 mmol of N,N-dimethylanilinium tetrakis(pentafluorophenyl)borate $[Me_2NHPhB(C_6F_5)_4]$, and 0.5 mmol of disobutylaluminum hydride into a glass vessel in a glovebox under nitrogen atmosphere and dissolving the substances in 25 mL of toluene, to obtain a catalyst solution;

adding the catalyst solution thus obtained, to the pressure-resistant stainless reactor, and heating the mixture in the reactor to 70° C.:

then adding ethylene to the pressure-resistant stainless reactor at pressure of the ethylene: 1.5 MPa and carrying out copolymerization at 70° C. for 2 hours:

stopping the copolymerization reaction by adding an isopropanol solution (1 mL) of 5 mass % 2,2-methylene-bis(4-ethyl-6-t-butylphenol) (NS-5) to the pressure-resistant stainless reactor; and isolating a copolymer by using a large amount of methanol and vacuum-drying the resulting copolymer at 50° C., thereby obtaining Copolymer a.

(Synthesis of Copolymer A)

Copolymer A was synthesized by: charging 70 g of styrene, 46 g of 2-norbornene, 90 g of a toluene solution containing 22 g of 1,3-butadiene, and 584 g of toluene into a thoroughly dry 2000 mL pressure-resistant stainless reactor;

charging, on the other hand, 0.125 mmol of mono(1,3-bis(tert-butyldimethylsilyl)indenyl) gadolinium bis(bis(dimethylsilyl)amide) complex $\{1,3\text{-}(t\text{-}BuMe_2Si)_2C_9H_5Gd[N(SiHMe_2)_2]_2\}$, 0.125 mmol of N,N-dimethylanilinium tetrakis(pentafluorophenyl)borate $[Me_2NHPhB(C_6F_5)_4]$, and 0.5 mmol of disobutylaluminum hydride into a glass vessel in a glovebox under nitrogen atmosphere and dissolving the substances in 25 mL of toluene, to obtain a catalyst solution:

adding the catalyst solution thus obtained, to the pressure-resistant stainless reactor, and heating the mixture in the reactor to 70° C.;

then adding ethylene to the pressure-resistant stainless reactor at pressure of the ethylene: 1.5 MPa and carrying out copolymerization at 70° C. for 2 hours;

stopping the copolymerization reaction by adding an isopropanol solution (1 mL) of 5 mass % 2,2-methylene-bis(4-ethyl-6-t-butylphenol) (NS-5) to the pressure-resistant stainless reactor; and isolating a copolymer by using a large amount of methanol and vacuum-drying the resulting copolymer at 50° C., thereby obtaining Copolymer A.

(Synthesis of Copolymer B)

Copolymer B was synthesized by: charging 70 g of styrene, 23 g of 2-norbornene, 90 g of a toluene solution containing 22 g of 1,3-butadiene, and 607 g of toluene into a thoroughly dry 2000 mL pressure-resistant stainless reactor;

charging, on the other hand, 0.125 mmol of mono(1,3-bis(tert-butyldimethylsilyl)indenyl) gadolinium bis(bis(dimethylsilyl)amide) complex $\{1,3\text{-}(t\text{-}BuMe_2Si)_2C_9H_5Gd[N(SiHMe_2)_2]_2\}$, 0.125 mmol of N,N-dimethylanilinium tetrakis(pentafluorophenyl)borate $[Me_2NHPhB(C_6F_5)_4]$, and 0.5 mmol of disobutylaluminum hydride into a glass vessel in a glovebox under nitrogen atmosphere and dissolving the substances in 25 mL of toluene, to obtain a catalyst solution;

adding the catalyst solution thus obtained, to the pressure-resistant stainless reactor, and heating the mixture in the reactor to 70° C.;

then adding ethylene to the pressure-resistant stainless reactor at pressure of the ethylene: 1.5 MPa and carrying out copolymerization at 70° C. for 2 hours;

stopping the copolymerization reaction by adding an isopropanol solution (1 mL) of 5 mass % 2,2-methylene-bis(4-ethyl-6-t-butylphenol) (NS-5) to the pressure-resistant stainless reactor; and isolating a copolymer by using a large amount of methanol and vacuum-drying the resulting copolymer at 50° C., thereby obtaining Copolymer B.

(Analysis of Copolymers)

Contents (mol %) of ethylene unit, styrene unit, 1,3-butadiene unit, and norbornene unit; ΔH (enthalpy relaxation); and the difference ($T_{em}-T_{im}$) between an extrapolated melting end temperature ($T_{em}$) and an extrapolated melting initiation temperature ($T_{im}$) were measured, respectively, for each of the copolymers thus obtained, by the methods described below. Further, the main chain structure was confirmed and the melting point, a degree of crystallinity, the number average molecular weight (Mn), the weight average molecular weight (Mw), and the molecular weight distribution (Mw/Mn) were measured, respectively, for each of the copolymers by the methods described below.

<Contents of Ethylene Unit, Styrene Unit, and Butadiene Unit>

Contents (mol %) of ethylene unit, styrene unit, and 1,3-butadiene unit in each of the copolymers were determined from integration ratios of respective peaks in $^1$H-NMR spectrum (100° C., d-tetrachloroethane reference: 6 ppm).

Specifically, contents (mol %) of ethylene unit, styrene unit, and 1,3-butadiene unit in the copolymer were determined based on the integration ratios of: aromatic hydrogen derived from styrene unit of the copolymer (5H: 7.4-6.4 ppm); olefin hydrogen derived from 1,4-bond butadiene unit of the copolymer (2H: 5.3-5.5 ppm); and respective aliphatic hydrogens of the copolymer (styrene (3H)+butadiene (4H)+ethylene (1H): 1.4-2.4 ppm). The results are shown in Table 1.

<Content of Norbornene>

A content of norbornene in each of the copolymers was determined from integration ratios of respective peaks in $^{13}$C-NMR spectrum (100° C., d-tetrachloroethane reference: 74.2 ppm). Specifically, a ratio of carbon derived from norbornene, observed in the range of 27-49 ppm, was determined based on the integration ratios. The result is shown in Table 1.

<ΔH (Enthalpy Relaxation)>

A sample was heated for each of the copolymers from −150° C. to 150° C. at a temperature-increasing rate of 10° C./minute and an endothermic peak observed in the range of 0° C. to 100° C. was regarded as ΔH of the copolymer. The result is shown in Table 1.

<$T_{em}$-$T_{im}$>

Figure 2:
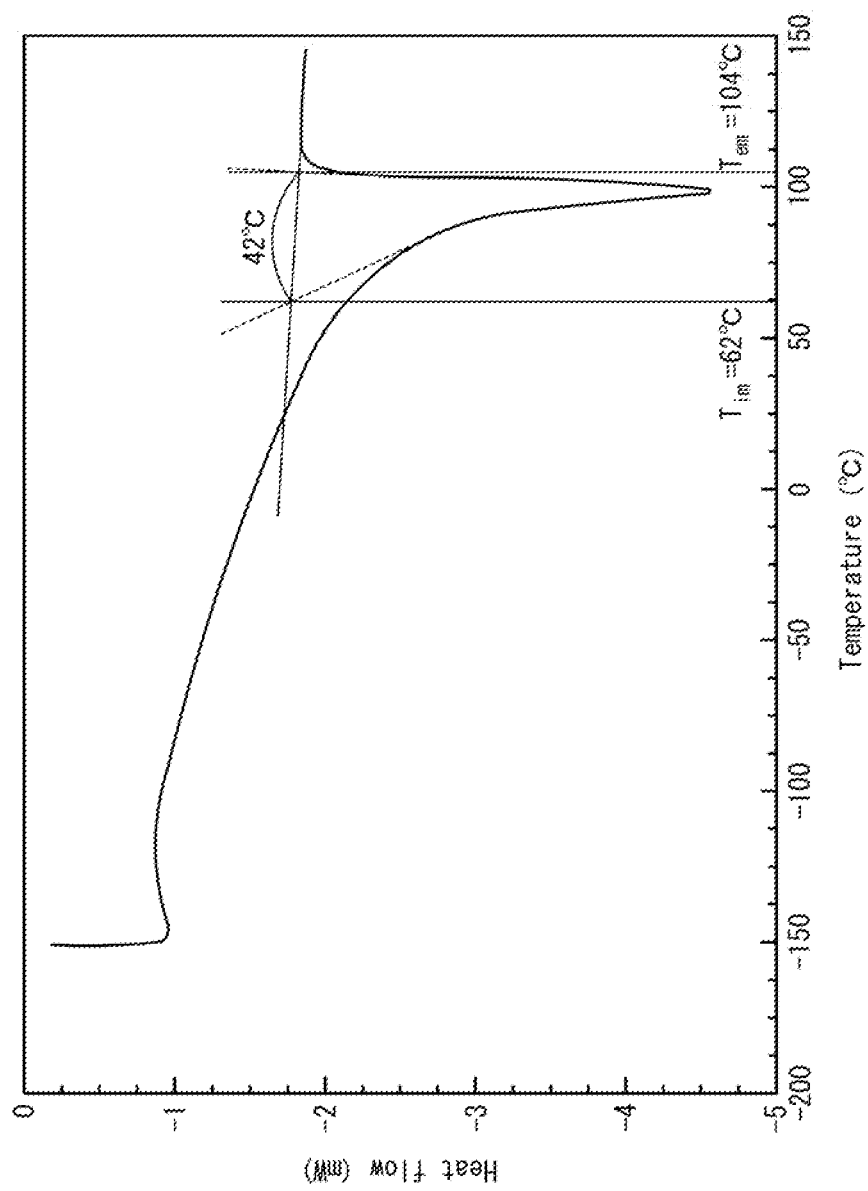
FIG. 2 is a DSC chart of copolymer A.
Figure 3:
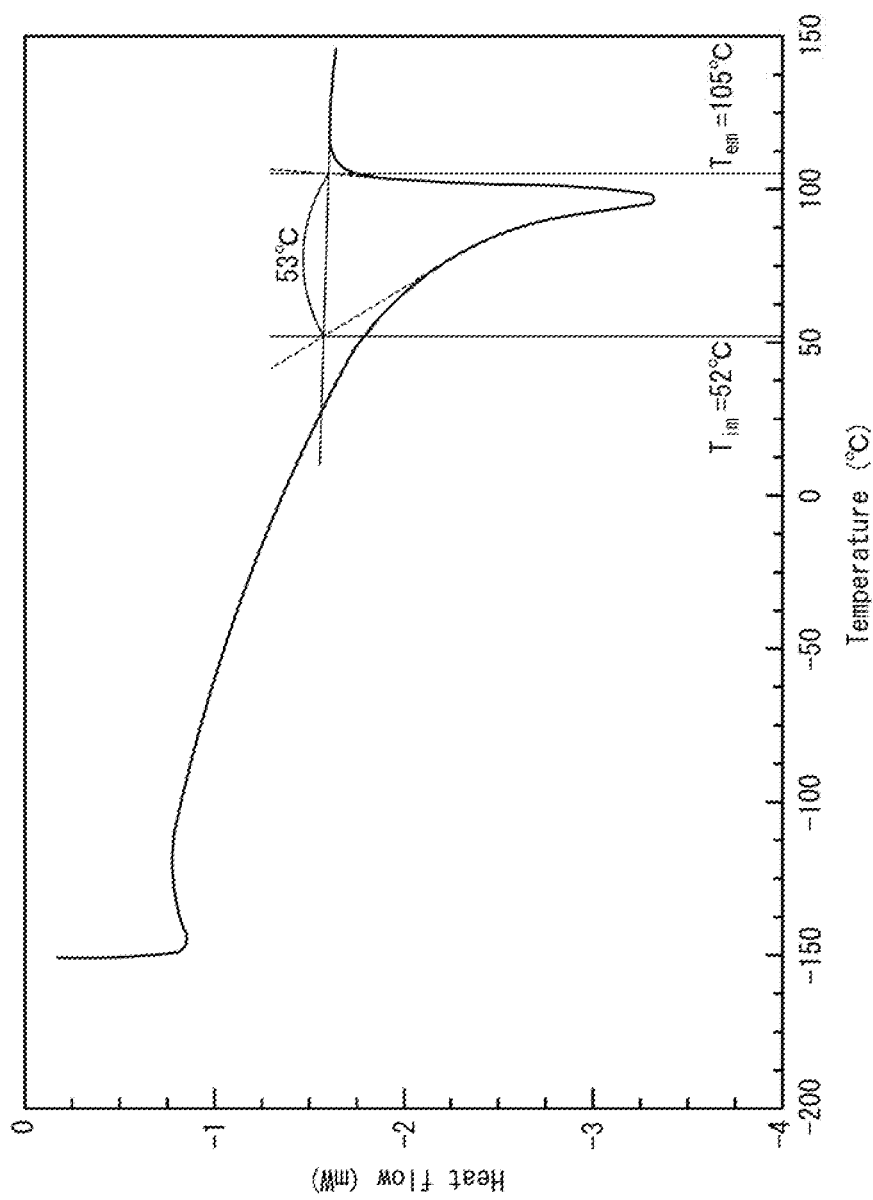
FIG. 3 is a DSC chart of copolymer B.

An extrapolated melting end temperature ($T_{em}$) and an extrapolated melting initiation temperature ($T_{im}$) were measured for each of the copolymers in accordance with JIS K7121 by differential scanning calorimetry (DSC), so that the difference ($T_{em}$-$T_{im}$) was calculated. The result is shown in Table 1. Further, the DSC charts of the respective copolymers are shown in FIGS. 1 to 3.

<Confirmation of Acyclic Structure of Main Chain>

A structure of the main chain was analyzed by NMR for each of the copolymers. None of the copolymers exhibited a peak in the range of 10-24 ppm in the $^{13}$C-NMR spectrum chart. Accordingly, it was confirmed that each of the copolymers has the main chain constituted of only acyclic structures.

<Melting Point>

Melting point of each of the copolymers was measured according to JIS K 7121-1987 by using a differential scanning calorimeter (DSC) "DSCQ2000" manufactured by TA Instruments Japan.

<Degree of Crystallinity>

A sample was heated for each of the copolymers from −150° C. to 150° C. at a temperature-increasing rate of 10° C./minute, so that an endothermic peak energy (ΔH1) of the copolymer was measured.

Further, crystal melting energy (ΔH0) of polyethylene having a crystal component ratio: 100% was measured in a manner similar to the measurement of ΔH1.

A degree of crystallinity (%) derived from ethylene unit (non-conjugated olefin unit) was calculated from a ratio (ΔH1/ΔH0) of the endothermic peak energy (ΔH1) of the copolymer with respect to the crystal melting energy (ΔH0) of polyethylene.

The endothermic peak energy of the copolymer sample and the crystal melting energy of polyethylene were measured, respectively, by a differential scanning calorimeter (DSC) "DSCQ2000" manufactured by TA Instruments Japan <Number Average Molecular Weight (Mn), Weight Average Molecular Weight (Mw), and Molecular Weight Distribution (Mw/Mn)>

The number average molecular weight (Mn), the weight average molecular weight (Mw), and the molecular weight distribution (Mw/Mn) in terms of polystyrene standard were determined for each of the copolymers, relative to monodisperse polystyrene as a standard reference material, by using gel permeation chromatography [GPC: HLC-8121GPC/HT manufactured by Tosoh Corporation, column: GMH$_{HR}$—H (S)HT×2 manufactured by Tosoh Corporation, detector: a differential refractive index detector (RI)]. The measurement temperature was 40° C.

TABLE 1

| | | Co-polymer a | Co-polymer A | Co-polymer B |
|---|---|---|---|---|
| Composition of copolymer | Content of 1,3-butadiene unit (mol %) | 12 | 12 | 10 |
| | Content of ethylene unit (mol %) | 82 | 83 | 86 |
| | Content of styrene unit (mol %) | 6 | 5 | 4 |
| | Content of norbornene unit (mol %) | 0 | 0 | 0 |
| Physical properties of copolymer | ΔH (J/g) | 59 | 77 | 70.4 |
| | $T_{em}$ − $T_{im}$(° C.) | 83 | 42 | 53 |
| | Melting point (° C.) | 100 | 99 | 98 |
| | Degree of crystallinity (%) | 20 | 26 | 24 |
| | Weight average molecular weight (Mw) (×1000) | 149 | 259 | 238 |
| | Molecular weight distribution | 2.3 | 1.9 | 2.2 |

It is understood from Table 1 that the cyclic non-conjugated olefin compound (E) (2-norbornene) is not incorporated into the copolymer but rather contributes, as a polymer, to reducing ($T_{em}$-$T_{im}$) of the copolymer.

(Preparation and Evaluation of Rubber Composition)

Rubber compositions were prepared by using a conventional Banbury mixer according to the blending formulation shown in Table 2. Elastic modulus and stability of elastic modulus were measured and evaluated for each of the rubber compositions thus prepared, by the methods described below. The results are shown in Table 2.

<Elastic Modulus>

Storage elastic modulus (G') was measured for each of the rubber compositions by using a dynamic spectrometer manufactured by Rheometrics, Inc. (U.S.A) under the conditions of tensile dynamic strain: 10%, frequency: 15 Hz, and temperature: 50° C. The storage elastic modulus (G') of the rubber composition of each of Examples 1, 2, relative to that of Comparative Example 1, was expressed by an index value according to the following formula:

(the measured value of Example)/(the measured value of Comp. Example 1)×100 The larger index value represents the higher elastic modulus.

<Stability of Elastic Modulus>

Stability of elastic modulus was determined by: measuring a first storage elastic modulus (G') for each of the rubber compositions by using a dynamic spectrometer manufactured by Rheometrics, Inc. (U.S.A) under the conditions of tensile dynamic strain: 10%, frequency: 15 Hz, and temperature: 50° C.; measuring a second storage elastic modulus (G') after one minute in a manner similar to the first measurement; calculating the difference between the first storage elastic modulus (G') and the second storage elastic modulus (G') for the rubber composition; and expressing stability of the elastic modulus of each Example/Comp. Example, relative to that of Comparative Example 1, by an index according to the following formula:

(the measured value of the second storage elastic modulus(G')−the measured value of the first storage elastic modulus(G'), of Example)/(the measured value of the second storage elastic modulus(G')−the measured value of the first storage elastic modulus(G'), of Comp. Example 1)×100

The larger index value represents the better stability of elastic modulus.

TABLE 2

| | | | Comp. Example 1 | Example 1 | Example 2 |
|---|---|---|---|---|---|
| Formulation | Copolymer a | Parts by mass | 100 | — | — |
| | Copolymer A | | — | 100 | — |
| | Copolymer B | | — | — | 100 |
| | Silica *1 | | 55 | 55 | 55 |
| | Silane coupling agent *2 | | 5 | 5 | 5 |
| | Stearic acid | | 2.0 | 2.0 | 2.0 |
| | Antioxidant *3 | | 1 | 1 | 1 |
| | Wax *4 | | 2 | 2 | 2 |
| | Zinc white | | 3.0 | 3.0 | 3.0 |
| | Vulcanization accelerator DPG *5 | | 2.0 | 2.0 | 2.0 |
| | Vulcanization accelerator DM *6 | | 2.0 | 2.0 | 2.0 |
| | Vulcanization accelerator NS *7 | | 0.5 | 0.5 | 0.5 |
| | Sulfur | | 2.0 | 2.0 | 2.0 |
| Physical properties | Elastic modulus | Index | 100 | 159 | 157 |
| | Stability of elastic modulus | Index | 100 | 150 | 152 |

*1 Silica: product name "Nipsil AQ" manufactured by Toso Silica Corporation
*2 Silane coupling agent: product name "ABC-856" manufactured by Shin-Etsu Chemical Co., Ltd.
*3 Antioxidant: product name "Nocrac 6C" manufactured by Ouchi-Shinko Chemical Industrial Co., Ltd.
*4 Wax: product name "SUNTIGHT A" manufactured by Seiko Chemical Co., Ltd.
*5 Vulcanization accelerator DPG: product name "Nocceler D" manufactured by Ouchi-Shinko Chemical Industrial Co., Ltd.
*6 Vulcanization accelerator DM: product name "Nocceler DM-P" manufactured by Ouchi-Shinko Chemical Industrial Co., Ltd.
*7 Vulcanization accelerator NS: product name "Nocceler NS-P" manufactured by Ouchi-Shinko Chemical Industrial Co., Ltd.

It is understood from the results shown in Table 2 that the rubber compositions of Examples, respectively containing the copolymer of the present disclosure, has high elastic modulus.

INDUSTRIAL APPLICABILITY

The copolymer of the present disclosure is applicable as a rubber component of a rubber composition. The production method for a copolymer of the present disclosure is applicable to production of the copolymer. The rubber composition of the present disclosure is applicable to various types of rubber articles including a tire. Further, the tire of the present disclosure is applicable to tires for various types of vehicles.

The invention claimed is:

1. A copolymer containing at least an acyclic non-conjugated olefin unit and a conjugated diene unit,
    wherein the difference ($T_{em}-T_{im}$) between an extrapolated melting end temperature ($T_{em}$) as measured in accordance with JIS K7121 and an extrapolated melting initiation temperature ($T_{im}$) as measured in accordance with JIS K7121 is not higher than 60° C, and the copolymer further contains an aromatic vinyl unit.

2. The copolymer of claim 1, wherein the acyclic non-conjugated olefin unit is constituted of only an ethylene unit.

3. The copolymer of claim 2, wherein the conjugated diene unit includes 1,3-butadiene unit and/or an isoprene unit.

4. The copolymer of claim 2, wherein the conjugated diene unit includes only 1,3-butadiene unit.

5. The copolymer of claim 1, wherein the conjugated diene unit includes 1,3-butadiene unit and/or an isoprene unit.

6. The copolymer of claim 1, wherein the conjugated diene unit includes only 1,3-butadiene unit.

7. The copolymer of claim 1, wherein the aromatic vinyl unit includes a styrene unit.

8. The copolymer of claim 1, wherein
    a content of the conjugated diene unit is in the range of 1 to 99 mol %, and
    the total content of the acyclic non-conjugated olefin unit and the aromatic vinyl unit is in the range of 1 to 99 mol %.

9. A rubber composition, wherein it contains the copolymer of claim 1.

10. A tire, wherein it uses the rubber composition of claim 9.

* * * * *